United States Patent
Kim et al.

(10) Patent No.: US 7,460,278 B2
(45) Date of Patent: Dec. 2, 2008

(54) 3-DIMENSIONAL DOT CODE FOR PAPER STORAGE

(75) Inventors: Changick Kim, Cupertino, CA (US); Vasudev Bhaskaran, Sunnyvale, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 650 days.

(21) Appl. No.: 10/932,193

(22) Filed: Sep. 1, 2004

(65) Prior Publication Data

US 2005/0167505 A1 Aug. 4, 2005

Related U.S. Application Data

(60) Provisional application No. 60/539,931, filed on Jan. 29, 2004.

(51) Int. Cl.
*G06K 15/00* (2006.01)
(52) U.S. Cl. .............. 358/3.28; 358/464; 358/505; 358/474; 382/165; 382/164; 382/100; 235/494; 235/469; 235/462.01
(58) Field of Classification Search ............ 358/2.1, 358/3.28, 464, 505, 474; 714/752; 235/469, 235/494, 462.01; 382/165, 164, 100; 707/101; 713/176
See application file for complete search history.

(56) References Cited

U.S. PATENT DOCUMENTS

| | | | |
|---|---|---|---|
| 5,337,362 A | 8/1994 | Gormish et al. | |
| 5,486,686 A | 1/1996 | Zdybel, Jr. et al. | |
| 5,896,403 A | 4/1999 | Nagasaki et al. | |
| 5,897,669 A | 4/1999 | Matsui | |
| 6,460,155 B1 * | 10/2002 | Nagasaki et al. | 714/752 |
| 6,473,516 B1 | 10/2002 | Kawaguchi et al. | |
| 6,650,773 B1 | 11/2003 | Maurer et al. | |
| 6,839,151 B1 * | 1/2005 | Andree et al. | 358/2.1 |

FOREIGN PATENT DOCUMENTS

| | | |
|---|---|---|
| EP | 0 469 864 | 2/1992 |
| EP | 0 764 944 A2 | 3/1997 |
| JP | 08-030977 | 2/1996 |
| JP | 09-081711 | 3/1997 |
| JP | 2004-523933 | 8/2004 |

* cited by examiner

*Primary Examiner*—King Poon
*Assistant Examiner*—Jamares Washington

(57) ABSTRACT

A 3-D dot code is embedded in a printed medium using an embedder that embeds data directly into the halftone dots of a selected file that is ready for printing. An extractor extracts the embedded bits by scanning the printed medium and then interprets the embedded data. A bleed-through elimination module in the extractor is able to eliminate adverse affects on the scanned input of the embedded data caused by bleed-through from the print on the opposite side of the page. The extractor may also include a module that compensates for a misaligned scanned input by automatically detecting the rotation and translation, and then registering the image so that the upper-left corner is located in a certain position. This operation expedites subsequent data retrieval, in which data is read by block matching.

7 Claims, 11 Drawing Sheets

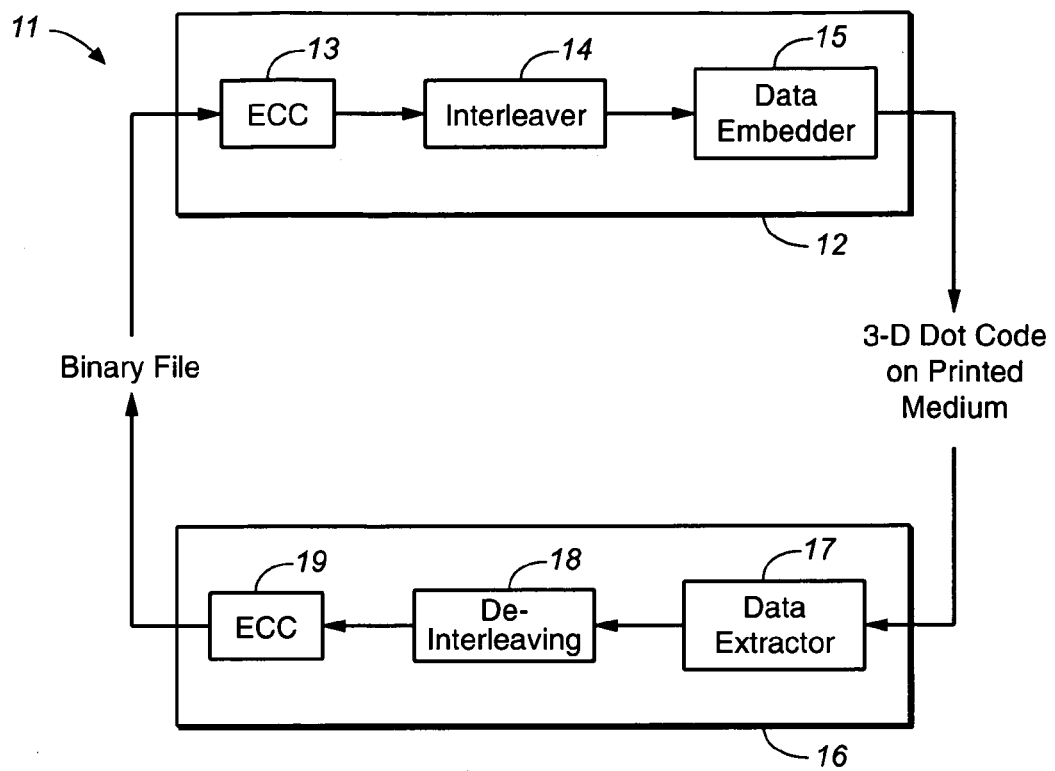
FIG._1
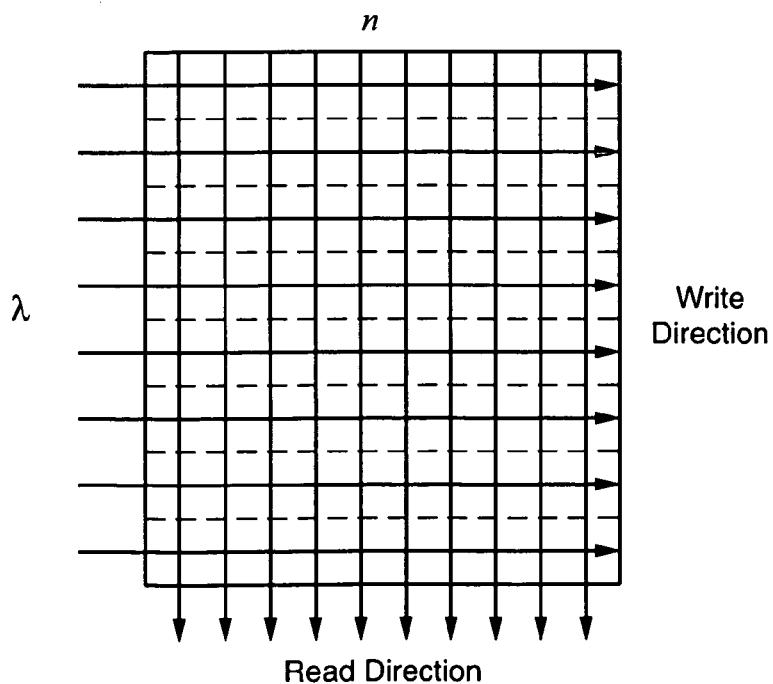
FIG._2

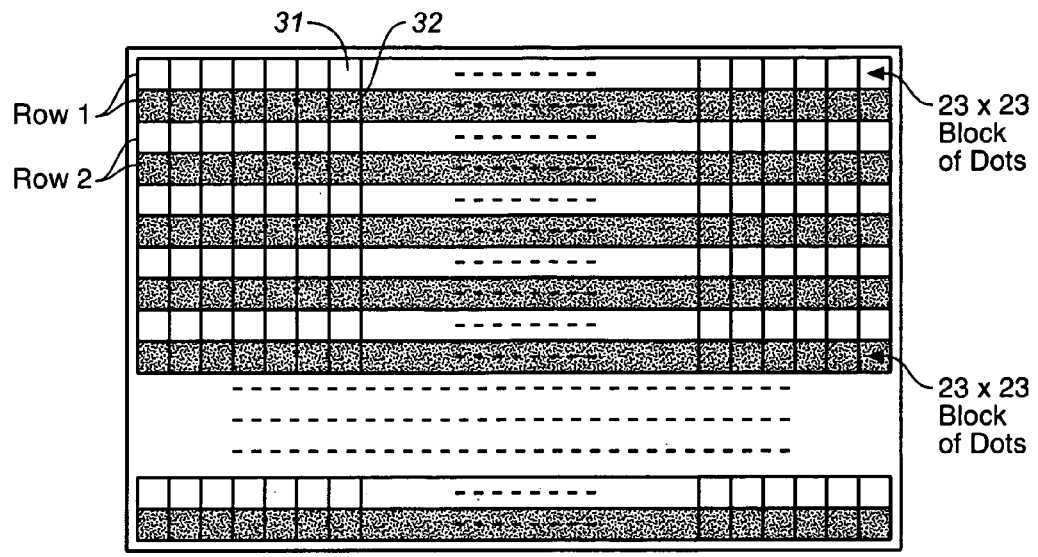
FIG._3
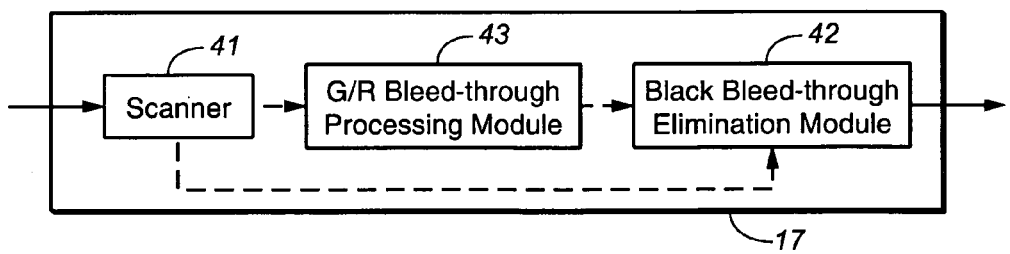
FIG._4

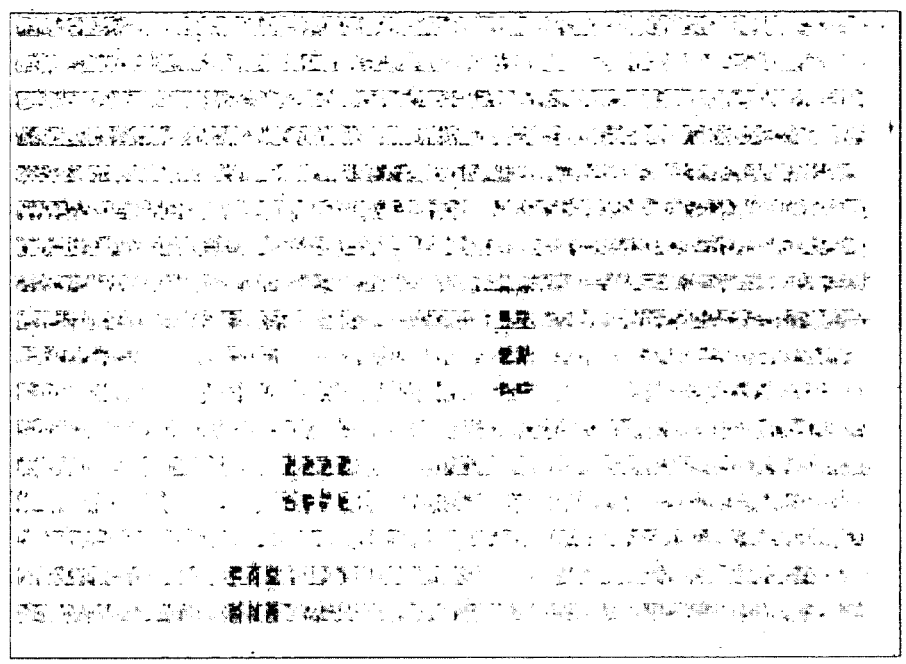
FIG._10a  Extracted 3-D dot code in yellow band
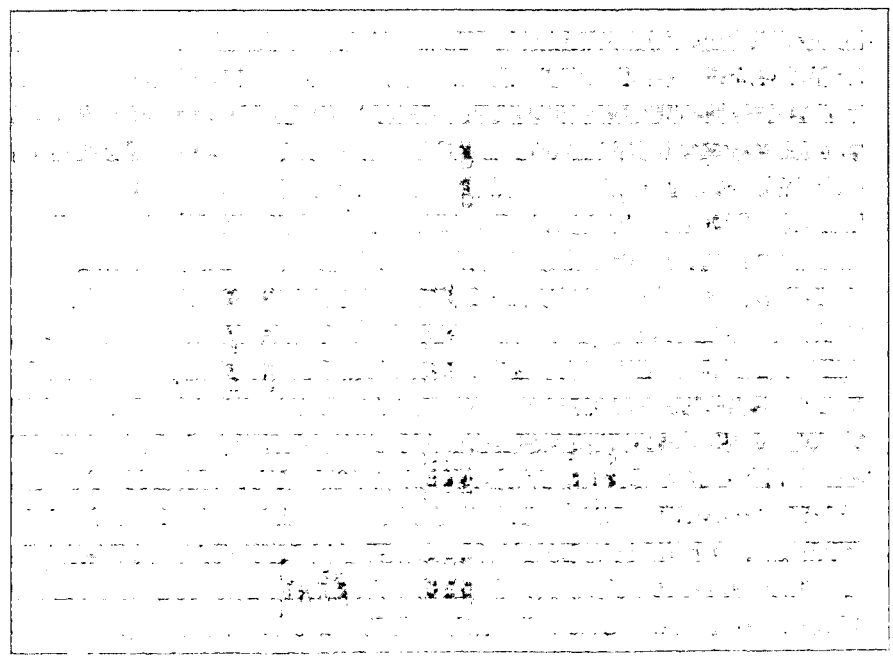
FIG._10b  Extracted 3-D dot code in magenta band

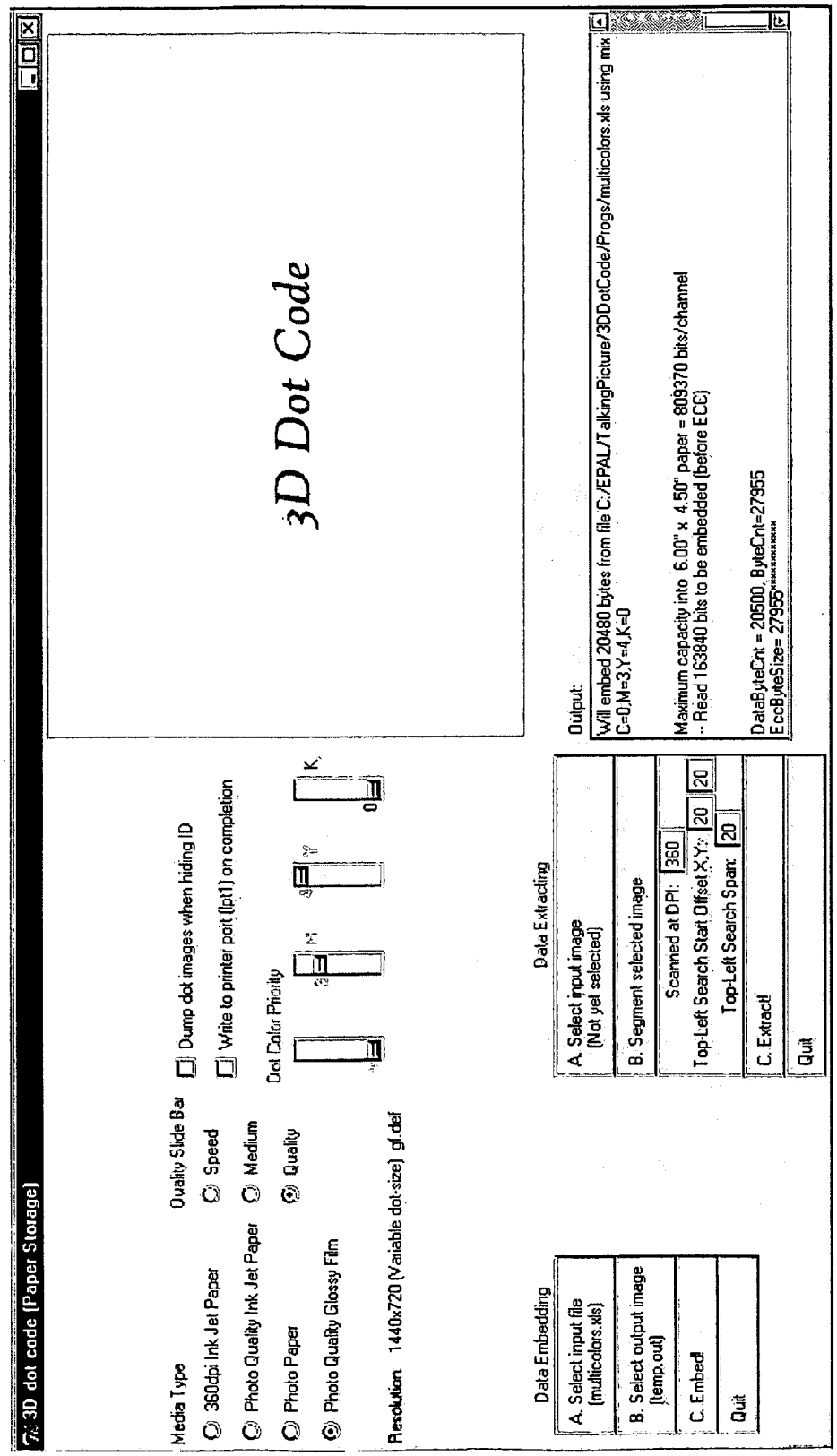
FIG._11

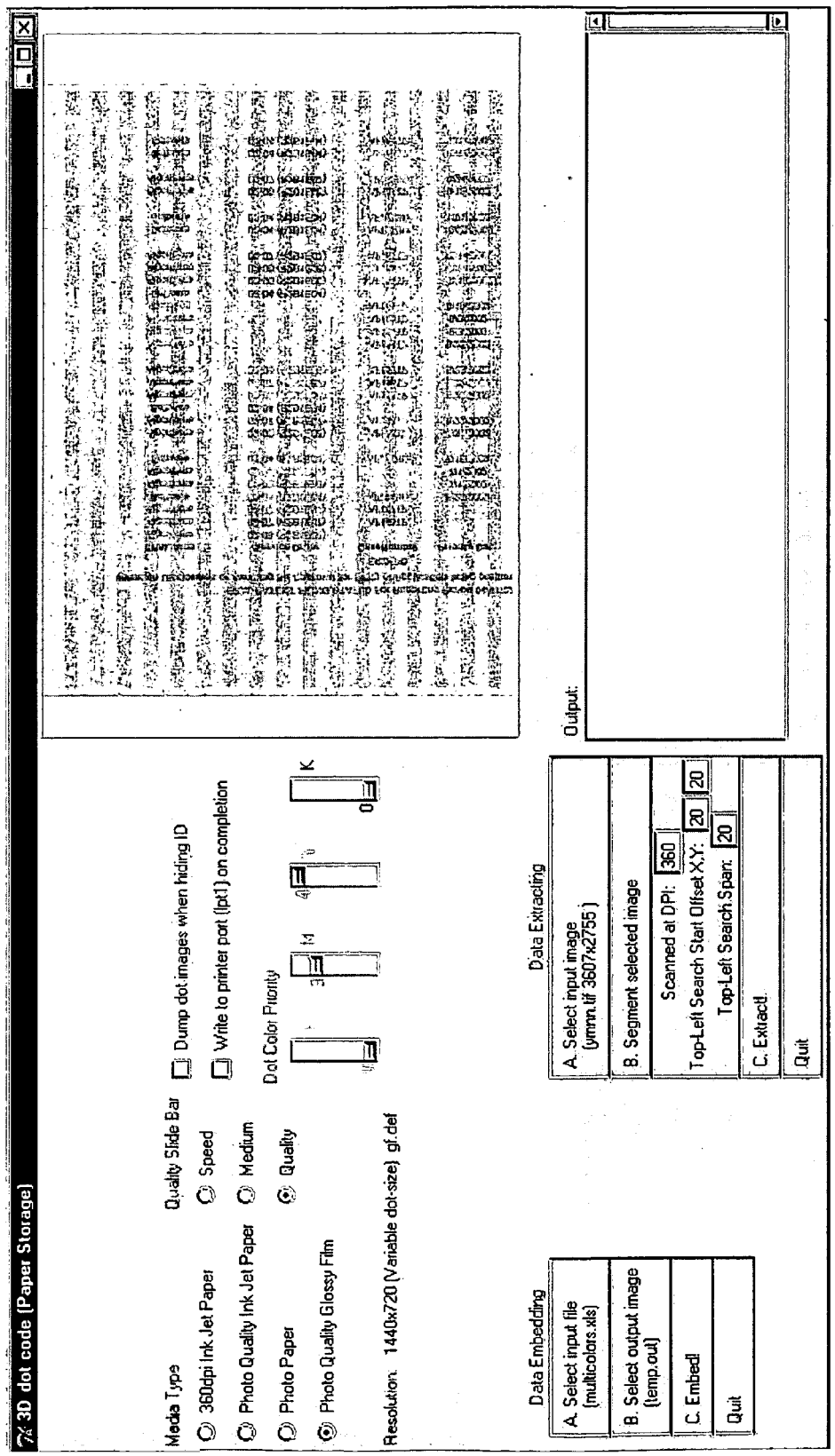
FIG._12

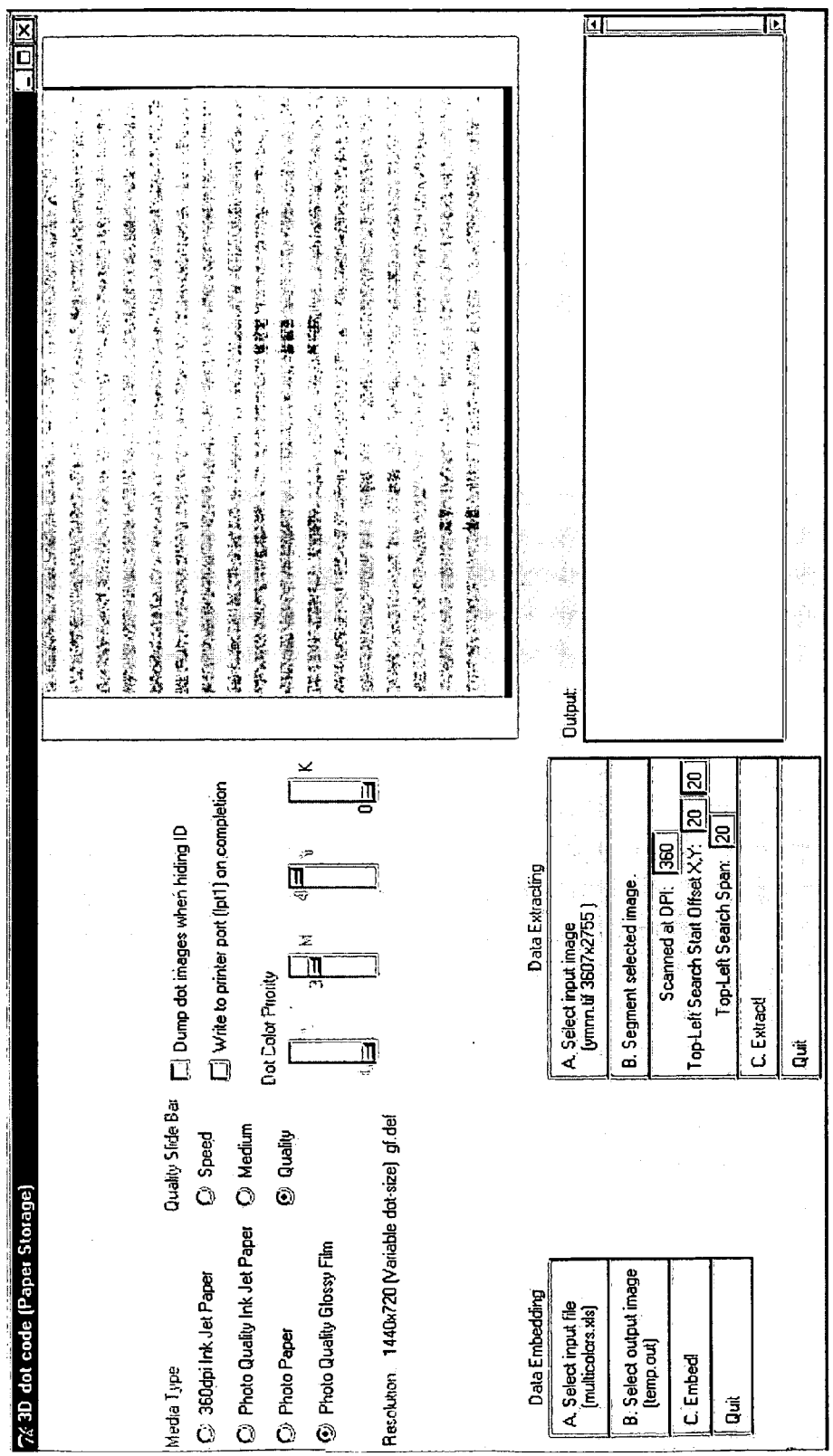
FIG._13

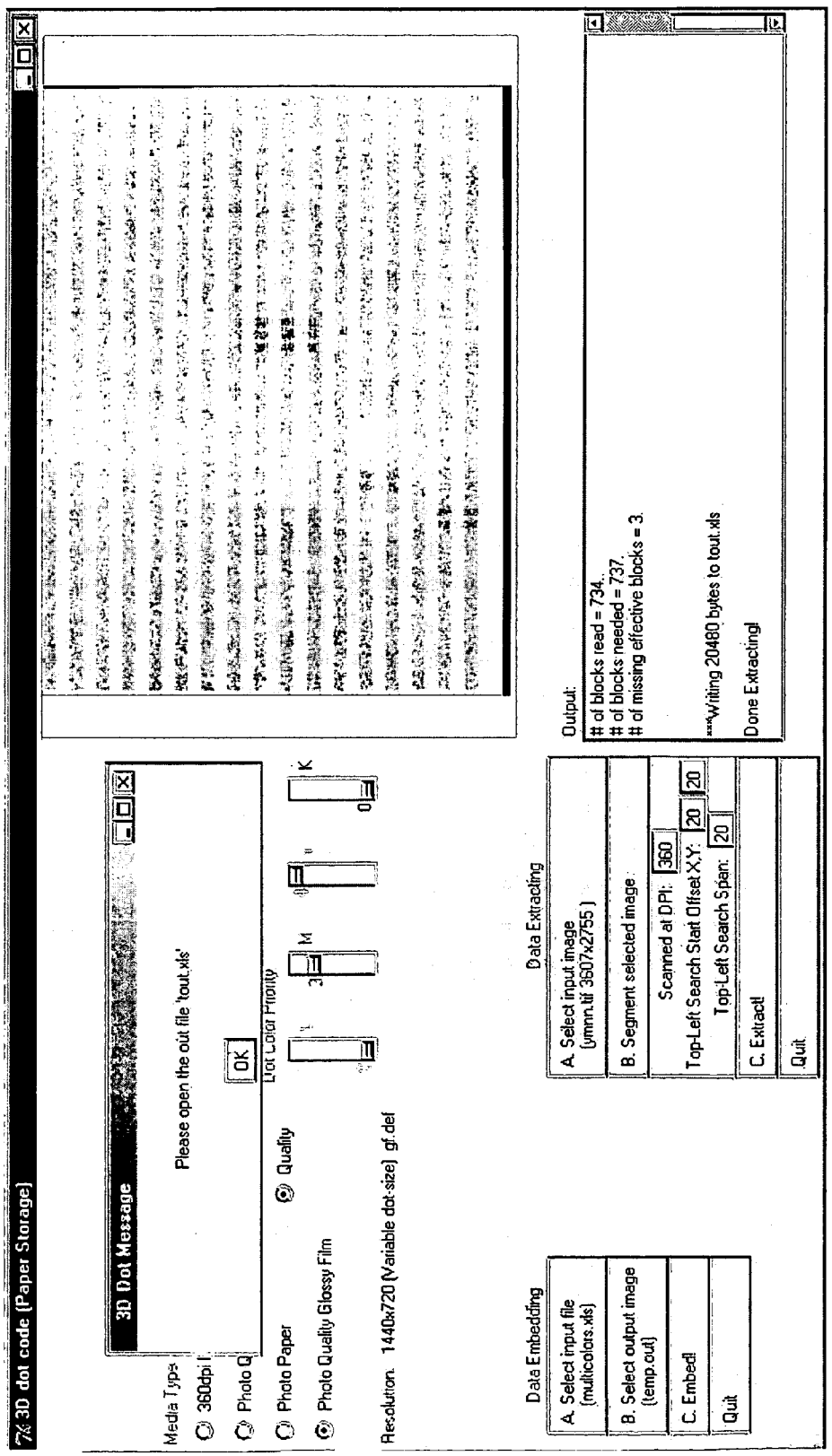
FIG._14

3-DIMENSIONAL DOT CODE FOR PAPER STORAGE

CONTINUING APPLICATION DATA

This application claims priority under 35 U.S.C. § 119(e) on provisional application Ser. No. 60/539,931, filed on Jan. 29, 2004. The content of this application is incorporated by reference herein.

BACKGROUND OF THE INVENTION

1. Field of the Invention

The present invention relates to data embedding, and more particularly to techniques for embedding a relatively large number of bits on a printout, e.g., regular paper. The techniques may be realized as methods, various steps/aspects of which may be performed by an appropriately configured apparatus (e.g., printer, copier, computer, etc.), or may be embodied as a program of instructions, e.g., in the form of software on a device-readable medium. Applications of the techniques include document management, fraud prevention, inventory tracking, ID cards, parts marking, and product tagging.

2. Description of the Related Art

Data embedding on regular paper is known, but thus far has been limited to relatively simple, lower capacity data embedding. For example, Xerox's dataglyph can record about 8 kbits per square inch assuming a 600 dpi print-scan scheme for data embedding and data recovery, and a 2-D barcode referred to as PDF417 can record only 2160 bits per square inch assuming a 400 dpi print-scan system.

Thus, higher data embedding capacity would be desirable in that it would have a greater range of applications.

OBJECTS OF THE INVENTION

An object of this invention is to provide a technique that achieves high-density and robust data embedding on a printout.

Another object of this invention is to provide 3-D dot code technology that enables the embedding of a relatively large amount of information on the opposite side of a printout.

SUMMARY OF THE INVENTION

According to one aspect of the invention, a dot code system that includes both an embedder and an extractor is provided. The embedder is configured to embed data in dots organized in blocks on a print medium, each block being embedded in two different colors, e.g., yellow and magenta, and the extractor is configured to convert the blocks of dots on the printed medium to a digital signal. In accordance with the invention, the extractor also includes a bleed-through elimination module configured to reduce or eliminate effects of bleed-through on extraction of the blocks of dots caused by matter printed on one side of the printed medium bleeding through to the other side on which the blocks of dots are embedded.

Preferably, the dots are the halftone dots generated during processing of print data to be printed on the print medium.

The dot code system as described above preferably further comprises an interleaver configured to interleave the data-to-be-embedded before it is embedded, and a de-interleaver configured to perform an inverse operation of the interleaver.

The dot code system may be implemented as a program of instructions and graphical user interface, with the instructions being embodied in a printer driver.

In another aspect, the invention involves a dot code embedder comprising an embedder configured to embed data in dots organized in blocks on a print medium, each block being embedded in two different colors, e.g., yellow and magenta, and an interleaver configured to interleave the data-to-be-embedded before it is embedded.

As is the case with the dot code system, the dot code embedder may be implemented as a program of instructions and graphical user interface, with the instructions being embodied in a printer driver.

In still another aspect, the invention involves a dot code extractor comprising an extractor configured to convert blocks of dots embedded on a printed medium to a digital signal, the extractor including a bleed-through elimination module configured to reduce or eliminate effects of bleed-through on extraction of the blocks of dots caused by matter printed on one side of the printed medium bleeding through to the other side on which the blocks of dots are embedded.

Preferably, the bleed-through elimination module comprises a black bleed-through elimination module configured to reduce or eliminate effects of bleed-through on extraction of the blocks of dots caused by black-colored matter printed on one side of the printed medium bleeding through to the other side on which the blocks of dots are embedded.

Preferably, the bleed-through elimination module further comprises a non-black bleed-through elimination module configured to operate in cooperation with the black bleed-through elimination module to reduce or eliminate effects of bleed-through on extraction of the blocks of dots caused by non-black-colored matter printed on one side of the printed medium bleeding through to the other side on which the blocks of dots are embedded.

Preferably, each block of dots is embedded in two different colors, and the extractor is configured to extract each block from one of the colors. One of the colors is considered to be the primary extraction color (e.g., yellow) and the other color is considered to be secondary extraction color (e.g., magenta), and the extractor is configured to attempt to extract each block from the primary extraction color first and to attempt to extract that block from the secondary extraction color only if the attempted extraction of that block from the primary extraction color was unsuccessful.

The dot code extractor is further preferably configured to automatically detect and correct rotation, translation, or both of the printed medium.

As is the case with the dot code system and embedder, the dot code extractor may be implemented as a program of instructions and graphical user interface, with the instructions being embodied in a printer driver.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings like reference symbols refer to like parts.

FIG. 1 is a block diagram of a 3-D dot code system configured in accordance with embodiments of the invention.

FIG. 2 is a schematic illustration of the interleaving process of the invention.

FIG. 3 is a schematic illustration of the layout of embedded dot blocks in two bands.

FIG. 4 is a block diagram of the extractor of the 3-D dot code system according to embodiments of the invention.

FIG. 6 shows a 3-D dot code embedded sheet with multi-color bleed-through.

FIGS. 10(a) and (b) show segmented images representing bleed-through-free extracted 3-D dot code in the yellow and magenta bands respectively.

FIG. 11 shows a graphical user interface (GUI) containing the controls of an embedder and extractor of this invention according to an embodiment thereof.

FIG. 12 shows a GUI similar to that shown in FIG. 11 with a selected input image shown in the upper right window.

FIG. 13 shows a GUI similar to that shown in FIG. 11 with a segmented image shown in the upper right window.

FIG. 14 shows a GUI similar to that shown in FIG. 11 with an indication that code extraction was successful.

DESCRIPTION OF THE PREFERRED EMBODIMENTS

Overview

Figure 5:
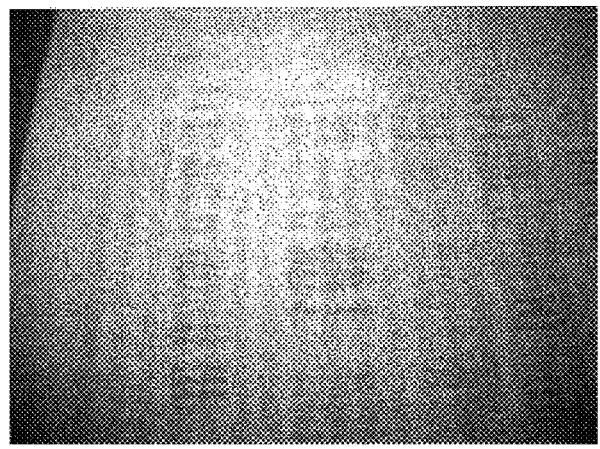
FIG. 5 shows bleed-through from the backside of a 3-D dot code embedded sheet.

The data embedding techniques of the present invention include 3-D dot code technology whereby data is embedded on a printout based on the color and the (x, y) spatial locations of the dot on the printout. Such technology can be embodied in a printing scheme that enables the embedding of a relatively large amount of information on the opposite side of a printout, which may be in the form of regular paper.

The embedding capacity of the present invention exceeds the data embedding capacities of other well-known techniques such as those mentioned above. In fact, the data embedding scheme of this invention can embed about 12 kbits per square inch. For example, on an 8.5"×11" sheet of regular paper, the 3-D dot code of this invention can embed up to about 150 k bytes (in the one band case). This is sufficient for recording various digital data, including about 10 pages of Microsoft Excel, several minutes of compressed audio or an 800×600 JPEG image. The capacity, however, can be reduced depending on the robustness of the settings. To overcome the "bleed-through problem" that is likely to occur in the situation in which the other side of the sheet is printed in multiple colors, the 3-D code may have redundant embedding in several colors at the expense of the capacity.

The embedding, as well as the extracting, techniques of this invention may be implemented with a 3-D dot code system generally comprising: (i) an embedder that allows the user to select a data file and then embeds the data directly into the halftone dots ready for printing; and (ii) an extractor that extracts the embedded bits from a scanned copy of the printed paper sheet.

The embedder and extractor are each able to perform multiple functions and preferably include sub-components or modules for carrying out these functions. As briefly noted above, the scanned input of the embedded data may suffer from bleed-through from the printed backside. Thus, a bleed-through elimination module is provided in the extractor to overcome this problem. The 3-D dot code system also preferably includes a module that compensates for a scanned input that is not well positioned. Such a module automatically detects the rotation and translation, and then registers the image so that the upper-left corner is located in a certain position. This operation expedites the following data retrieval, in which data is read by block matching.

Referring now to FIG. 1, a block diagram of a 3-D dot code system 11 configured in accordance with embodiments of the invention is shown. In the embedding process, a binary data file is input into the embedder 12, encoded with error code correction (ECC) in ECC block 13, and interleaved in interleaver 14 to protect against random and burst errors. In a data embedder 15, the interleaved data is then embedded in blocks of dots, preferably 23×23 sized blocks. In a preferred embodiment, a printer driver is modified to generate blocks of dots in half-tone space. The blocks can be embedded in raster scan order on a paper sheet. The data can be embedded in any color of the output device color space, e.g., in any of the colors Cyan (C), Magenta (M), Yellow (Y) or Black (K) in the CMYK color space, which is the color space of most printers. Usually yellow dots are preferred since they do not affect the opposite side of the paper sheet when that side contains some printed matter.

The extraction process is the inverse of embedding. A printout, e.g., regular paper with printed matter and embedded data, is input into the extractor 16, where data extraction, de-interleaving and ECC occur in a data extractor 17, de-interleaver 18 and ECC 19, respectively. Further details of these components as well as other features of 3-D dot code system 11 are described below in connection with the embedding and extracting algorithm performed by the system.

Algorithm

A basic algorithm that achieves high-density and robust data embedding on a printout, e.g., regular paper, in accordance with the invention is described below.

A. Embedding

A.1 Error Control Techniques

Since underlying physical mechanisms may result in fundamental performance limits, the use of error control techniques is important.

A.1.1 Forward Error Correction

Transmission errors can be detected and corrected by using forward error correction (FEC) codes. This is achieved by adding redundancy to the information bits to obtain codewords such that the probability of a codeword becoming another valid code word is decreased to the level of highly unlikely. There are two main types of FEC codes: linear block codes and convolutional codes. Although they are very different in detail, they follow the same basic principle. In this invention, a linear block code is preferably used as the error control technique.

In linear block codes, the information to be transmitted is segmented into blocks of k bits. In an (n,k) code, r=n−k bits of redundancy are added to k bits to make an n-bit code word. The redundancy or parity symbols are computed for each block. Thus, the code rate of block codes is given by cr=k/n. For a systematic code, the k information bits are not altered and r bits are simply appended to the payload bits. The error correction capability of a (n,k) code is primarily influenced by the minimum hamming distance $d_{min}$, which should be as large as possible. The hamming distance of two binary code words is the number of bits in which they differ. For a code with $d_{min}$, the number of bit errors that can be corrected is at least $t=\lfloor (d_{min}-1)/2 \rfloor$, where the notation $\lfloor x \rfloor$ indicates the largest integer no greater than x. In this invention, Bose, Chaudhuri, Hocquengham (BCH) code is used, although other suitable linear block codes may be used.

The error correction functions are performed by ECC blocks 13 and 19 in the illustrated embodiment.

A.1.2 Interleaving

Most block codes are designed to combat random independent errors. As will be explained below, since data is embedded and retrieved block-by-block, any failure in reading a block results in burst errors. The performance of FEC codes on channels with burst errors is enhanced by interleaving. The idea behind interleaving is to spread the error burst in space. Interleaving the coded message before embedding causes the bursts of channel errors to be spread out in space as random errors that can be handled by error-correction decoders.

Interleaver 14 accepts the coded symbols in blocks from the FEC encoder, permutes the symbols, and then feeds the rearranged symbols to the data embedder 15. The usual permutation of the block is accomplished by filling the rows of a $\lambda$-row-by-n-column ($\lambda \times n$) array with the encoded sequence, where $\lambda$ represents the Interleaving Degree or Interleaving Depth. After the array is completely filled, the symbols are read by columns and transmitted over the channel. The schematic illustration of the interleaving process is shown in FIG. 2. In extractor 16, de-interleaver 18 performs the inverse operation. Symbols are written into the de-interleaver by columns and read by rows.

A.1.3 Data Embedding

Now, the interleaved data is embedded in blocks of dots, preferably 23×23 sized blocks with the horizontal/vertical distance between consecutive dots being 2/360 inches. In the illustrated embodiment, each block thus has 529 dots. With each dot indicating one bit (1/0=present/absent), the raw capacity of each block is 529 bits. Within each block, 41 bits (=11+19+11) are used for synchronization. Each block holds two error-corrected chunks (code words) of data bits, each chunk being 255 bits in length. Within each chunk, there are 163 actual bits (including 11 of the sync bits) and the remaining are error-correction bits (BCH, correcting errors of up to 12/255 bits). To summarize, the 529 bits of a block are split up as: $529=2*[D+s+E]+S$, where, $D=152$ ($=163-11$), $s=11$, $E=92$ ($=255-163$) and $S=19$. Note that the total "payload" of actual data bits within a single block is $2*152=304$ bits. Blocks are organized in raster scan order in a strip one block wide. The first (top-left) block holds a small header indicating the width and height of the picture and the number of embedded bits. The top-left block has a 16-byte header with the following values:

first 4 bytes have nDataBytes (# of data bytes) value
next 4 bytes have imW360 (image-width at 360 dpi) value
next 4 bytes have imH360 (image-height at 360 dpi) value
next 4 bytes are reserved (0 for now)

The algorithm of this invention can accommodate two-band, i.e., two-color, embedding. The layout of embedded dot blocks in two bands is illustrated in FIG. 3. In the layout, each row comprises two bands/colors. In this embedding scheme, after a strip of dot blocks are embedded in a first color, e.g., yellow, the embedding process is repeated to embed the same strip of blocks in a second color, e.g., in magenta. Thus, dot block 31 contains the same data as dot block 32, except that block 31 is embedded in yellow and block 32 is embedded in magenta. The same relationship holds true for each of the other pairs of like-positioned blocks shown in FIG. 3. In this way, the same data set is embedded in two bands. Using two bands is advantageous because it compensates for the "bleed-through problem," which will be explained below in connection with extraction.

Once the embedding process is finished, a print file containing the 3-D dot code, i.e., the embedded information, is generated and can be printed on a print medium, such as regular paper, using an ink-jet printer, such as an Epson Stylus Color 740. In such an environment, the 3-D dot code can be generated in half-tone space in the printer driver.

B. Extracting

B.1 Scanning Details

Referring to FIG. 4 in which components of data extractor 17 are shown in block diagram form, it can be seen that the extraction process begins by scanning a medium containing 3-D dot code using a scanner 41 or other suitable data capturing and digitizing device. Scanning should be done at >360 dpi and at an optical resolution supported by the scanner (typically 600 dpi). In one embodiment, the setting for scanning is −40 for brightness and +40 for contrast to achieve good scan quality.

B.2 Segmenting Strips

Figure 6:
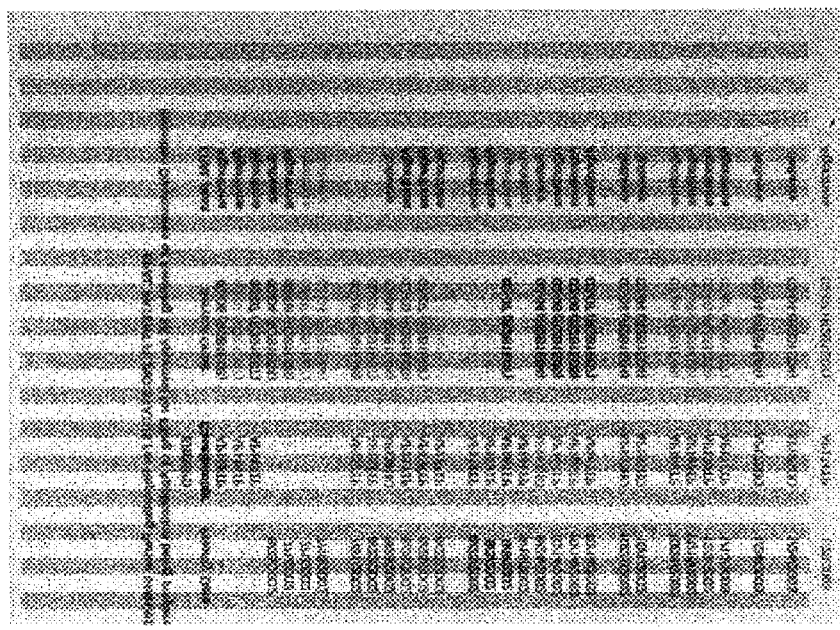
Figure 7:
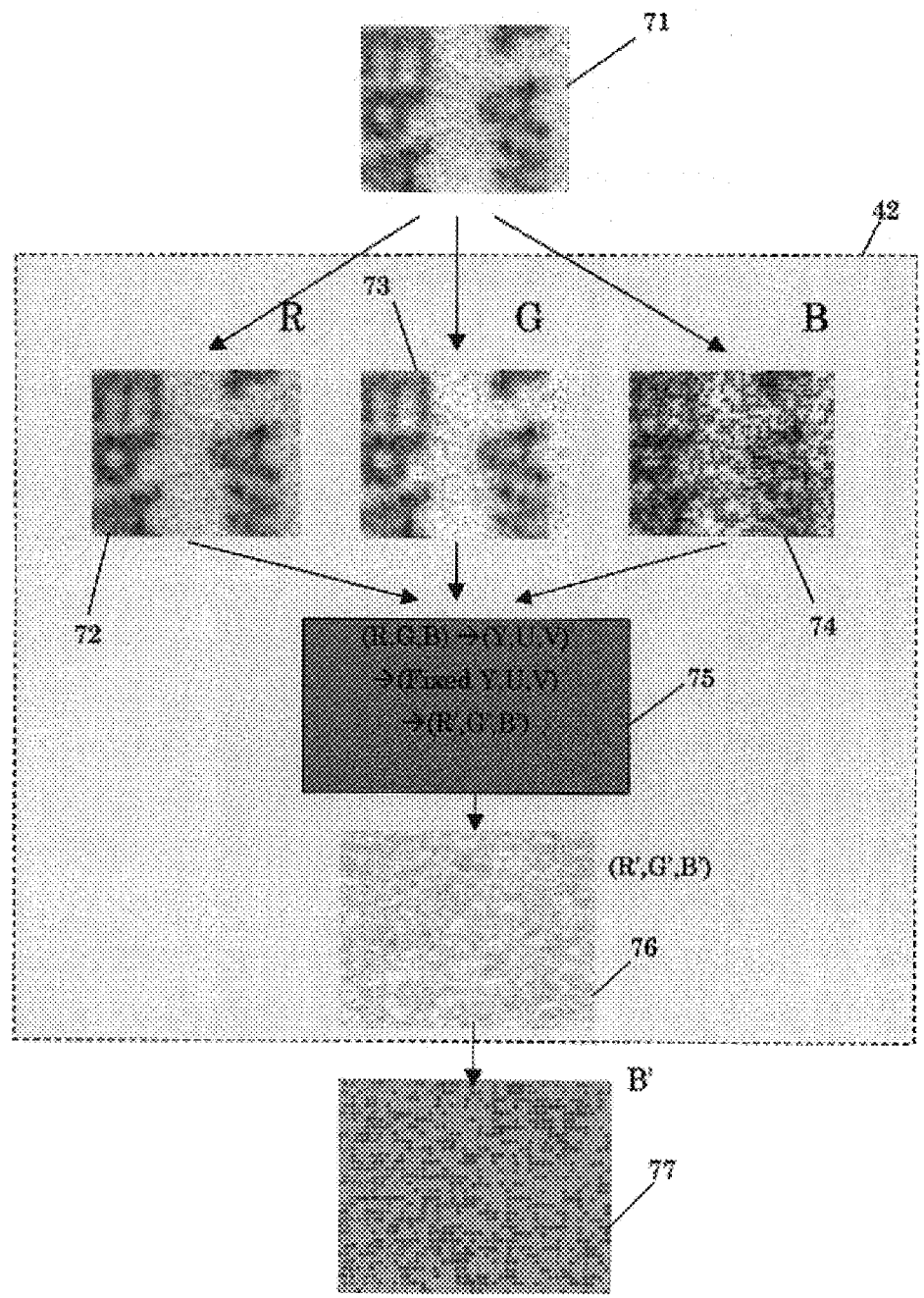
FIG. 7 is an illustration of the functions of the black bleed-through elimination module.

The scanned input of 3-D dot code embedded sheet may suffer from the bleed-through from the printed backside as shown in FIG. 5. Multi-color bleed-through may also occur as shown in FIG. 6. Since extracting blocks may be hindered by bleed-through, a black bleed-through elimination module 42 is provided. The common bleed-through color is black. As shown in FIG. 7, when a scanned 3-D dot code color image 71 is split into red (R), green (G) and blue (B) channels, identified by the reference numerals 72, 73 and 74 respectively, all three channels are evenly affected by the bleed-through, which means that only the brightness channel Y is affected when the image is viewed in YUV color space. Accordingly, black bleed-through elimination module 42 transforms the image from RGB to YUV color space and sets all of the pixels in the Y channel to the same value, as indicated in functional block 75 of FIG. 7. From the re-transformed RGB (R'G'B') image 76, which is free of bleed-through, B' data 77 is extracted in the case of yellow dot code. G' data is extracted in the case of magenta dot code.

While black ink bleed-through affects each of the R,G,B channels of the scanned image almost evenly, bleed-through in another color typically affects only one or two channels. Thus, for bleed-through in other colors, some additional processing is performed to convert the bleed-through in a non-black color to the black bleed-through case. This additional processing, when required, is performed in a non-black bleed-through processing module 43 before the image is input into black bleed-through module 42, as shown in FIG. 4.

When bleed-through occurs in a non-black color, the degradation function is obtained from the degraded channel(s), and the function is applied to the unaffected channel(s) to affect (darken) all of the R,G,B channels. This process, which is performed in module 43, turns the problem into the black ink bleed-through case. Once transformed into the black ink bleed-through case, the affected 3-D dot codes are restored by using black bleed-through elimination module 42 to extract the blue channel data (yellow dot code) or the green channel data (magenta dot code), thereby yielding 3-D dot code that is free of bleed-through. Thus, if the bleed-through is in multiple colors, they are first modified to exhibit the effect of black bleed-through, and then the black bleed-through is removed.

Figure 8:
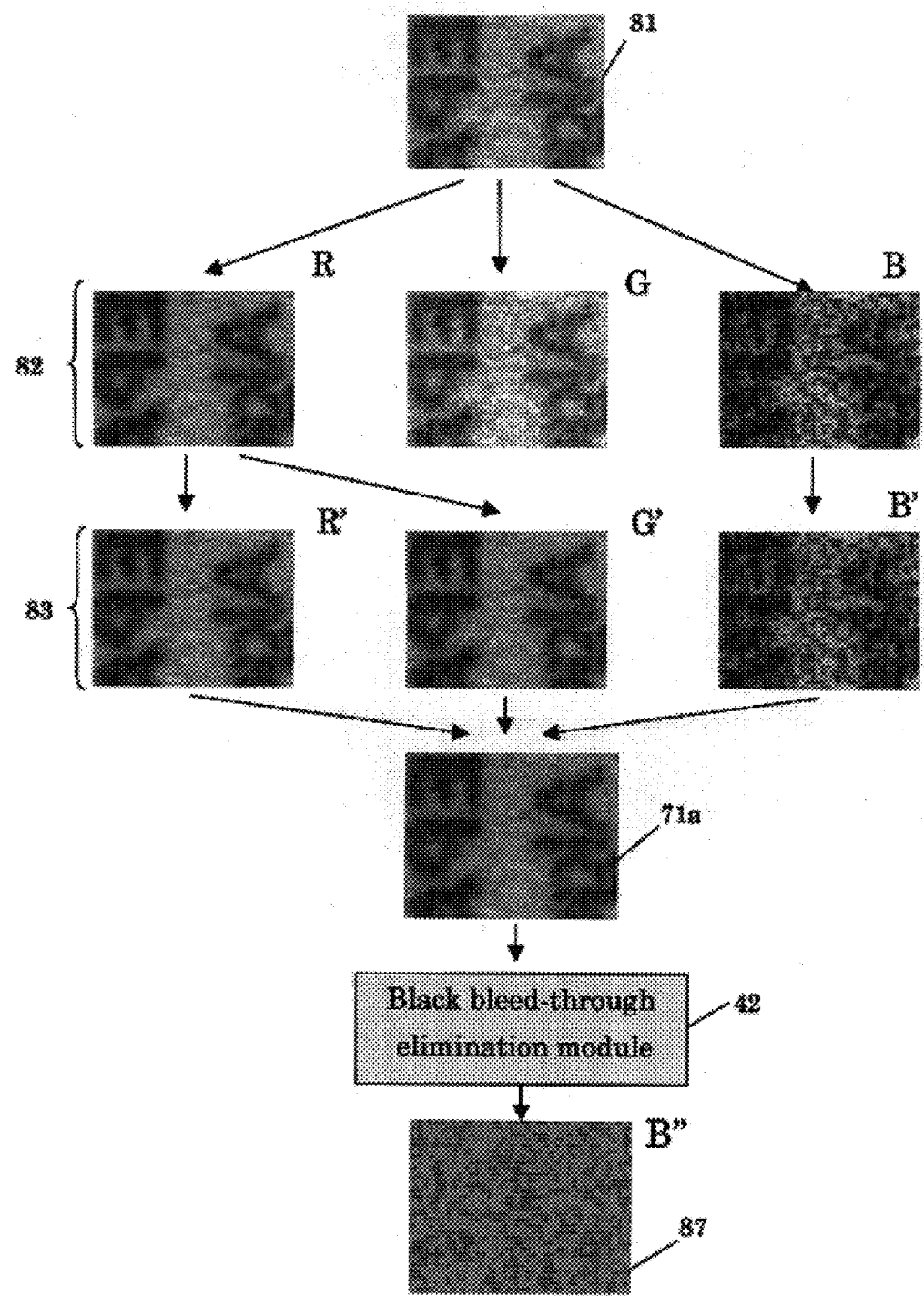
FIGS. 8 and 9 are illustrations of the functions of green and red bleed-through processing modules respectively.
Figure 9:
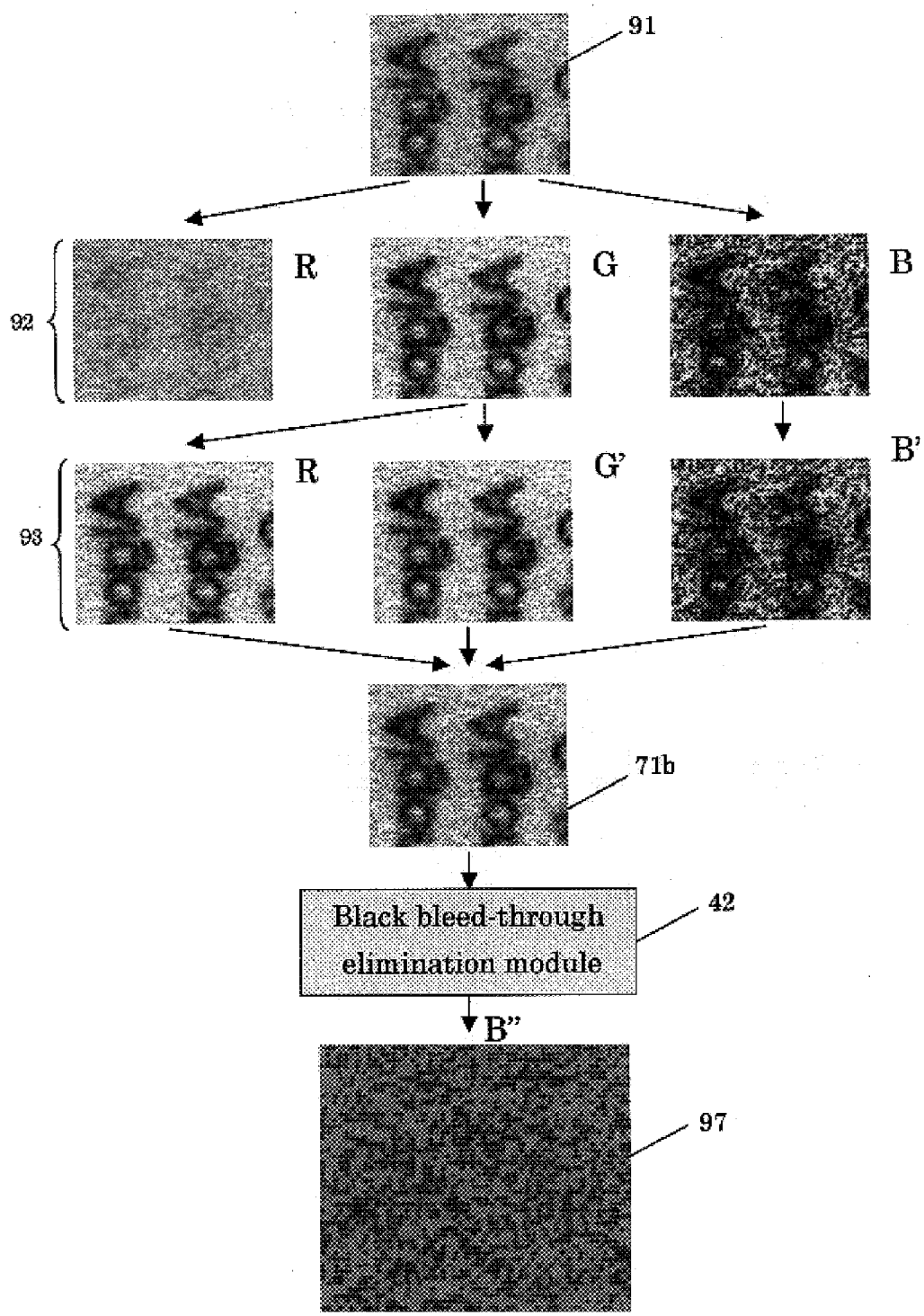

The additional processing for the green and red bleed-through cases are illustrated in FIGS. 8 and 9 respectively.

In the case of green bleed-through, scanned 3-D dot code color image 81 is separated into its three color components R, G and B 82 and the degradation function from the R channel is used to modify the G channel. In the case of red bleed-through, after separating scanned 3-D dot code color image 91 into its R, G and B components 92, the degradation function from the G channel is used to modify the R channel. For yellow 3-D dot code, for each pixel (xy), the R and G channels are modified as follows: $R'_{x,y}=\min(R_{x,y},G_{x,y})$, $G'_{x,y}=\min(R_{x,y},G_{x,y})$, $B'_{x,y}=B_{x,y}(1)$. Now, the resulting R'G'B' image 71a/71b exhibits black bleed-though.

Thus, image 71a/71b is input to black bleed-through elimination module 42 which performs the transformation/re-transformation operations described above in connection with the black bleed-through case to generate an R"B"G". Yellow 3-D dot code free from bleed-through is extracted from the yellow band of the B" data 87/97, as shown in the segmented image in FIG. 10(a).

We found that at least two colors of 3-D dot code are needed to handle all of the types of bleed-through. Preferably, two bands (yellow and magenta) of 3-D dot codes are alternatively embedded. Yellow dot code can handle the bleed-through of all colors except yellow, blue and cyan, and magenta dot code can handle bleed-through of all colors except magenta, green and red. Thus, yellow dots can handle red, green and magenta bleed-through, while magenta dots can handle the bleed-through of blue, yellow and cyan. In the case of magneta 3-D dot code, the following formula (2) is substituted for formula (1) above: for each pixel (x,y), the R and B channels are modified as follows: $R'_{x,y}=\min(R_{x,y},B_{x,y})$, $B'_{x,y}=\min(R_{x,y},B_{x,y})$, $G'_{x,y}=G_{x,y}(2)$. Also, for magenta 3-D dot code, the G" data 87/97 is taken from the output of the black bleed-through elimination module 42, and magenta 3-D dot code free from bleed-through is extracted from the magenta band of the G" data, as shown in the segmented image in FIG. 10(b). In evaluating the algorithm with a variety of bleed-though situations, we have experienced a block (23×23 dots) retrieval failure rate of less than 0.5%, which means that only one out of 200 blocks has not been read.

B.3 Image Registration

The scanned and segmented input image may not be well positioned. Thus, the 3-D code system 11 automatically detects the rotation and translation, and then registers the image so that the upper-left corner is located in a certain position. This step expedites the following data retrieval, in which data is processed by block matching.

Note that the number of dot blocks to be retrieved is very large. So, fast retrieval becomes a key factor. Since it takes much time to rotate and match synch bits in each block, rotating the entire input image is critical for the fast retrieval. To that end, the invention includes a registration algorithm, which automatically detects rotation of the scanned image, and re-rotates and shifts it so that its upper left point is located at (20,20). The algorithm detects the upper-most points of the 3-D dot code along the code's upper boundary. From this set of upper-most dots, the line equation of the upper border line is computed by using linear regression. Once the line equation is found, the left-most dot along the line becomes the upper-left corner of the 3-D dot code, which is also used as a center point for rotating the scanned image. The center point is shifted so that the rotated dot code has its upper-left corner at (20,20).

B.4 Block Matching

Since the embedded data are block-based, they are retrieved block-by-block using correlation-based block matching. As explained above, each block contains 41 bits (or dots) for synchronization. Since the positions of the synch bits in a block are known, this positional information is exploited for matching. If 40 or more dots are matched, the task is to read two codewords in the block. If both codewords are well decoded by an error control technique, block retrieval is finished. If block retrieval failed, the search position is changed and new matching is started. For each search position, rotation is also applied. Due to the registration described above, the angle range for rotation is very small, which means faster matching speed. The registration also makes the system easily locate the top-left block, which contains information about embedded data size and images size.

Basically, the block retrieval is performed on blocks embedded in Y, i.e., yellow strips. If matching for a particular block in the Y strip fails, the system looks down for the block in the corresponding position in the M, i.e., magenta strip. When matching is done for a particular block in an M strip, the next block is searched for in Y strips. That is, yellow is the primary extraction color and magenta is the secondary extraction color. Matching for a particular block may fail in both Y and M strips, but only rarely. However, if that is the case, then the extractor declares a failure on that block, and skips it. This failure becomes a burst error, but by performing de-interleaving, they become random errors, which can be fixed by a decoder having error control.

Applications and Implementations

The 3-D dot code is preferably generated in half-tone space in the printer driver of a printer, preferably an ink-jet printer. A user can print the 3-D dot code using the printer, e.g., an Epson color printer.

To that end, embedder 12 and extractor 16 can be conveniently implemented as command-line executable programs in the printer driver. When the embedder program is launched a menu labeled "Data Embedding" contains tools of embedder 12 can be presented as a graphical user interface (GUI), as shown in FIG. 11. The same screen of the GUI may also present a "Data Extracting" menu of tools for extractor 16. In one embodiment, the embedder 12 is implemented in three steps: select input data file to embed in 3-D dot code format; select output print file name to be printed out; and embed to create the print file. The GUI of FIG. 11 shows the status after embedding is finished.

Using extractor 16 from the GUI is straightforward. In most cases, the image would have been scanned at 600 dpi; therefore, no changes are needed in the default settings in the extractor. By clicking the sub-menu "Segment selected image," the input image is segmented into a Y channel image and an M channel image. Then the 600 dpi scaled image is re-sampled to 360 dpi. Next, by clicking the sub-menu "Extract!", the extraction algorithm first looks for the top-left block in an area around the top-left corner of the image, as specified in the GUI. The defaults should be fine most of the time.

After an input image is chosen, a reduced resolution version of the image is displayed in the GUI window on the right, as shown in FIG. 12. FIG. 13 shows the segmented image with the 3-D dot code in the yellow band. FIG. 14 shows the messages when entire block reading is successful.

As the foregoing demonstrates, the present invention provides a 3-D dot code embedding/extracting algorithm that enables high-density and robust data embedding on a printout. The algorithm has a variety of applications, including document management, fraud prevention, inventory tracking, ID cards, parts marking, and product tagging. One application scenario envisaged is embedding Excel data on the backside of a printout to give a recipient would have more control to modify and process the Excel data after scanning the embedded 3-D dot code data.

While the invention has been described in conjunction with several specific embodiments, it is evident to those skilled in the art that many further alternatives, modifications and variations will be apparent in light of the foregoing description.

Thus, the invention described herein is intended to embrace all such alternatives, modifications, applications and variations as may fall within the spirit and scope of the appended claims.

What is claimed is:

1. A dot code extractor, comprising:
an extractor configured to convert blocks of dots embedded in two different colors embedded on a printed medium to a digital signal, one of the two different colors is considered to be the primary extraction color and the other of the two different colors is considered to be a secondary extraction color, and the extractor attempts to extract each block from the primary extraction color first and attempts to extract that block from the secondary extraction color only if the attempted extraction of that block from the primary extraction color was unsuccessful, the extractor including;
a bleed-through elimination module configured to reduce or eliminate effects of bleed-through on extraction of the blocks of dots caused by matter printed on one side of the printed medium bleeding through to the other side on which the blocks of dots are embedded.

2. A dot code extractor as recited in claim 1, wherein the bleed-through elimination module comprises a black bleed-through elimination module configured to reduce or eliminate effects of bleed-through on extraction of the blocks of dots caused by black-colored matter printed on one side of the printed medium bleeding through to the other side on which the blocks of dots are embedded.

3. A dot code extractor as recited in claim 2, wherein the bleed-through elimination module further comprises a non-black bleed-through elimination module configured to operate in cooperation with the black bleed-through elimination module to reduce or eliminate effects of bleed-through on extraction of the blocks of dots caused by non-black-colored matter printed on one side of the printed medium bleeding through to the other side on which the blocks of dots are embedded.

4. A dot code extractor as recited in claim 1, wherein the primary extraction color is yellow and the secondary extraction color is magenta.

5. A dot code extractor as recited in claim 1, wherein the dot code extractor is configured to automatically detect and correct rotation, translation, or both of the printed medium.

6. A dot code extractor as recited in claim 1, wherein the dot code extractor comprises a program of instructions and a graphical user interface.

7. A dot code extractor as recited in claim 6, wherein the program of instructions is embodied in a printer driver.

* * * * *